INVENTOR
JOHN CHARLES BARR

United States Patent Office 2,717,491
Patented Sept. 13, 1955

2,717,491

HEAT AND POWER SUPPLY SYSTEM WITH INTEGRATED STEAM BOILER AND GAS TURBINE PLANT

John C. Barr, Ascot, England, assignor to Power Jets (Research & Development) Limited, London, England, a British company Application September 8, 1952, Serial No. 308,480

Claims priority, application Great Britain September 28, 1951

4 Claims. (Cl. 60—49)

This invention relates to combined heat and power supply systems.

For a number of years back pressure steam turbines and waste heat boilers have been utilized to absorb energy content from hot fluids which would otherwise be wasted. Heat has been obtainable from such ancillary equipment for, say, space heating and local electrical power generation has wholly or partly supplied factory loads. In recent years the use of gas turbine plant in these circumstances has been increasingly favored and a number of schemes incorporating gas turbines have been devised.

Gas turbine plant combined with steam generation in a common installation can be the means of producing high thermal efficiency. Behind the present invention there lies the intention to provide a combined heat and power supply system of high thermal efficiency and which is flexible in operation as well.

According to the present invention there is provided a combined heat and power supply system in which a steam-raising boiler is provided with combustion supporting gas from a turbine arrangement which also produces shaft power characterized by means for varying the steam output and by means for varying the shaft power output, either output being variable without substantial effect upon the other.

The invention also provides a combined heat and power supply system comprising a rotary compressor-turbine combination operable to produce shaft power and to supply combustion-supporting gas for a steam-raising boiler, heat input means for the gas flow between the compression and expansion stages of said combination and a by-pass connection incorporating an adjustable throttle enabling a predetermined proportion of said flow to circumvent said expansion stage and to pass directly to the output side of said combination whereby the shaft power developed is made variable without substantial effect upon the steam-raising capacity of the boiler.

The invention further provides a combined heat and power supply system comprising a rotary compressor-turbine combination operable to produce shaft power and to supply combustion-supporting gas for a steam-raising boiler, means for providing heat input to the gas flow between the compression and expansion stages of said combination which heat is in normal operation at least partly supplied by the exhaust gases from the boiler and means for maintaining said heat input substantially constant despite changes in the heat content of said exhaust gases whereby steam output can be varied without substantial effect upon the shaft power output.

An indirect heater may heat the gas flow from the compression stage of the combination, the heat being acquired from the boiler exhaust gases. In addition that gas flow may later pass through a combustion chamber in which fuel is burnt. The boiler exhaust gases leaving the air heater are conveniently used to warm the boiler feed water.

The heat input maintaining means may comprise a combustion chamber either in the duct by means of which exhaust gases pass from the boiler to the heat input means or in a duct by means of which adjustable quantities of gas by-pass the boiler.

Steam delivered by the boiler after use as a heat source and after being condensed is returned as feed water to the boiler in one embodiment of the invention. In another embodiment a steam turbine is incorporated, steam from the boiler passing directly thereto and additional shaft power being developed. The feed water returned to the boiler by the closed circuit may be insufficient to maintain continuous operation of the system in which case a compressor-still may be utilized for delivering the remainder, some of the shaft power developed being used to drive this compressor.

The invention will be clearly understood from the following description of certain embodiments thereof given by way of example only which are illustrated in Figures 1 and 2 of the accompanying drawing.

In the drawing ducts are represented by single lines and arrows on those lines show the direction of fluid flow.

The following description makes reference to the drawing in which.

Figure 1:
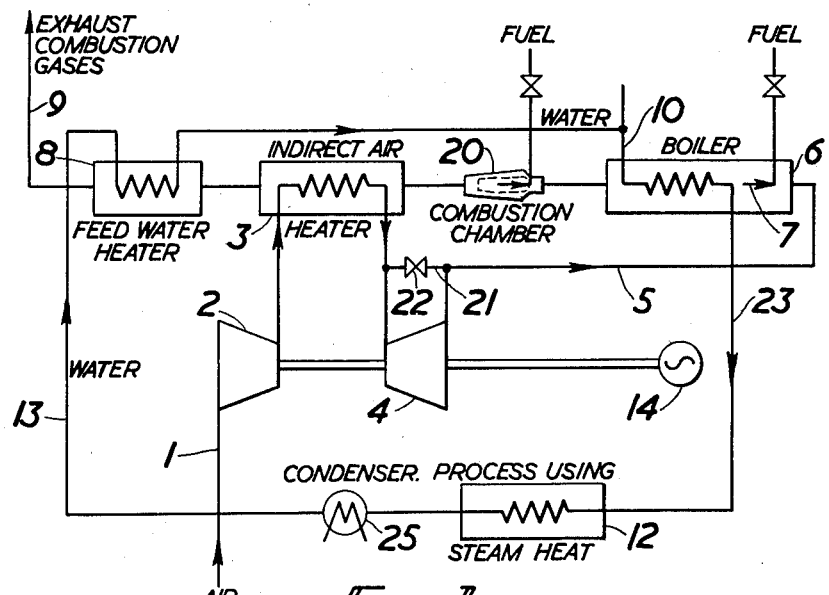
Figure 1 is a diagrammatic view of one embodiment of the invention.

Air enters by the duct 1 and is compressed in the compressor 2. The compressed air is heated in the air heater 3 and is returned to the turbine 4 wherein it is expanded. The turbine and the compressor are on the same shaft, the compressor being driven by the turbine. The air from the outlet of the turbine which is still hot is passed via a duct 5 to a boiler 6. The fuel supply, conveniently an oil supply, is fed to burners in the boiler shown at 7. Hot gases from the boiler are taken via ducting which incorporates a combustion chamber 20, passed through the indirect air heater 3 and from there into the feed water heater 8. Gases leaving this heater have very little heat content and are exhausted to atmosphere by the duct 9.

Water enters the boiler by the pipe 10 and the steam supply from the boiler is taken via the duct 23 to be used as a heat source in whatever industrial process is to be performed e. g. a drying process, this being shown schematically at 12. Wet steam is recovered from the process and returned via a condenser 25 and the pipe 13 to the feed water heater 8 from whence it passes back through the supply pipe 10 to the boiler. The power produced by the turbine 4 which exceeds that required for driving the compressor 2 is available to drive the generator 14.

Flexibility in operation is important in any scheme of this kind so that the user is not faced with the necessity for reducing the supply of compressed steam whenever the need for electrical generation is itself reduced. The alternative condition is also to be catered for. If the supply of electricity is to be maintained and the process steam required is not so great as formerly then the fuel supply to the boiler is reduced or some burners cut off. At the same time the combustion chamber 20 is started up and this supplies such extra heat as is required to maintain substantially constant the heat input to the air heater.

If the electrical load required falls the local generation can be reduced by by-passing air through the duct 21 from the input to the output side of the turbine 4. This duct is controlled by throttle valve 22 and the operation is as follows. As the flow through the turbine 4 is reduced with the opening of the throttle valve 22 the shaft power produced is less. However as the load is also less, the compressor delivery can be kept up and the flow obtained in the duct 5 is still sufficient for full boiler operation. The exact steam output can of course be adjusted by the fuel input to the burners 7 but the reduced shaft power output can be achieved while the steam supply remains substantially unaffected. A good proportion of the heat content of the air by-passed in this way is recovered by the boiler and the air heater so that the reduction in thermal efficiency is not large. An approximate calculation of the thermal efficiency expected from a combined heat and power supply system according to the invention has been made as shown below. In making this calculation and it has been presumed that all the steam from the boiler is passed directly to the process, as shown diagrammatically in Figure 1.

| | |
|---|---|
| Higher calorific value of coal _____B. t. u__ | 12,000 |
| Air coal ratio in boiler _____ | 20:1 |
| Air heater thermal ratio _____per cent__ | 80 |
| Compressor efficiency (polytropic) ____do____ | 86 |
| Air turbine efficiency (polytropic) _____do____ | 86 |
| Turbine inlet temperature _____°C____ | 700 |

Using these assumptions it has been found that the overall thermal efficiency is approximately 75%. The boiler efficiency required was found to be about 70%. For 1000 kw. of electrical power the process steam supply at 30 lb./sq. in. gauge and 15° F. superheat is about 32,000 lb./hr.

Figure 2:
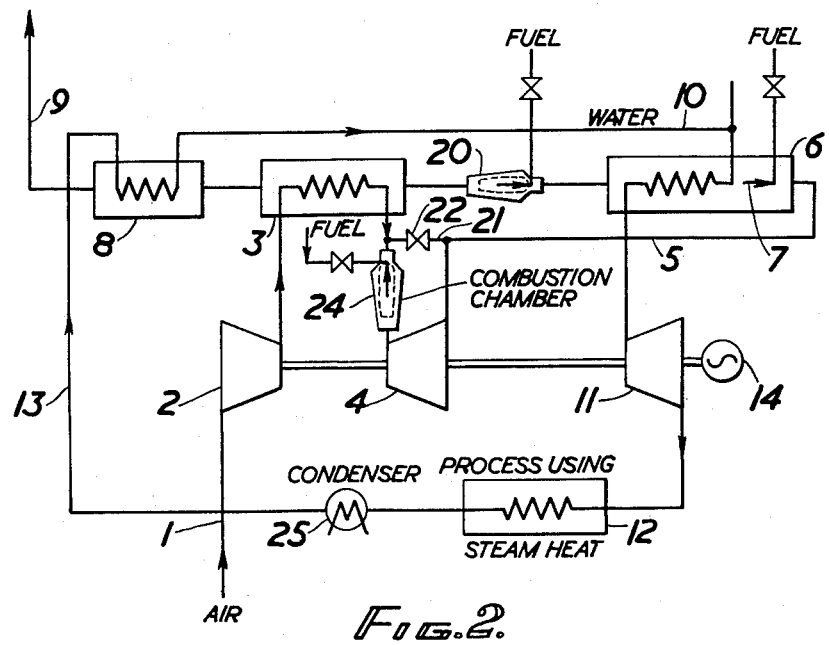
Figure 2 is a diagrammatic view of a modification of the invention of Figure 1.

The ratio of shaft power to steam output can be raised by putting in the steam turbine 11 as shown in Figure 2. This second layout is identical with that previously described apart from the introduction of the steam turbine 11 which is mechanically connected to the same single output shaft as the other turbine 4 and the addition of the combustion chamber 24. The latter is situated upstream of the turbine 4 which receives the combustion products and is therefore a gas turbine in the normal sense. The additional combustion chamber is downstream of the intersection of the by-pass duct with the hot compressed air supply ducting from the air heater 3 to the turbine 4.

In this instance reduction of shaft power without serious upset of the steam supply is achieved in exactly the same way as before, i. e. by-passing air through the duct 21 and reducing the output of the turbine 4. The combustion chamber 24 need not normally be in operation. When reduced steam supply is required however with maintained shaft power output, the combustion chamber 24 is brought into operation. The boiler fuel supply is reduced and the combustion chamber 20 is brought into operation to maintain the air heater heat input as before. Due to the presence of the steam turbine 11 however the shaft power provided to the generator 14 is also reduced unless boosting power can be obtained. Fuel burnt in the airstream passing through the combustion chamber 24 provides this extra energy input. The power output of the turbine 4 is boosted and this counteracts the reduced power output of the steam turbine 11 so that the total shaft power output remains substantially constant despite the reduced steam output.

The plant layout shown requires no extraordinary items of equipment, the steam plant is standard although the compression of a hot air supply to it will correspondingly reduce the fuel required. The indirect air heater may be a straightforward heat exchanger of a kind already incorporated in other gas turbine plant.

Although the available shaft power is used, in the embodiment described, to drive an electric generator, it will be apparent that mechanical use of the power developed is within the scope of the invention.

Such a system as is shown in Figure 2 may be compared with the common practice of using a diesel engine for power generation and a boiler for raising a steam supply. Although the gas turbine arrangement would require a greater quantity of fuel for the combustion chamber than is used by a diesel engine the fuel used in the boiler would be reduced for the heat content remaining in the output from the gas turbine would be fed thereto. The diesel engine wastes 60–65% of its heat energy in the jacket water and exhaust and this loss can be avoided by the expedient proposed.

What I claim is:

1. A combined heat and power supply system comprising rotary air compressor means, an air heater for air compressed thereby, turbine means operable upon the output of said air heater driving said compressor means and producing shaft power, a steam-raising boiler, ducting from said boiler to said air heater for the flow of boiler exhaust gases, a combustion chamber located in said ducting and operable to maintain substantially constant the heat input to said air heater despite changes in the heat content of said exhaust gases, a by-pass duct connecting the input side of said turbine means to the output side thereof, valve means in said duct operable to cause adjustable quantities of hot compressed air to by-pass said turbine means and a fluid flow connection between the output side of said turbine means and said boiler through which the exhaust from the former flows to provide combustion-supporting gas for the latter.

2. A combined heat and power supply system as claimed in claim 1 and which comprises apparatus to which steam from said boiler gives up heat, a condenser to which steam from said apparatus is fed, a feed water heater whose heat input is obtained from said boiler exhaust gases after they have passed through said air heater and piping connecting said condenser to the feed water heater and the latter to said boiler.

3. A combined heat and power supply system as claimed in claim 1 and which comprises a steam turbine fed directly from said boiler.

4. A combined heat and power supply system as claimed in claim 3 and which comprises a mechanical connection between said turbine means and said steam turbine so that they both contribute to a single shaft output, and a combustion chamber arranged so that it receives air from said air heater at a point downstream of said by-pass duct on the input side of said turbine means and so that it delivers hot gas to said turbine means.

References Cited in the file of this patent

UNITED STATES PATENTS

| | | |
|---|---|---|
| 2,502,941 | Giger et al. _____ | Apr. 4, 1950 |
| 2,604,755 | Nordström et al. _____ | July 29, 1952 |
| 2,605,610 | Hermittee et al. _____ | Aug. 5, 1952 |
| 2,663,144 | Nordström et al. _____ | Dec. 22, 1953 |